July 10, 1945.   H. N. PARSONS   2,380,327
BEARING
Filed April 3, 1943   2 Sheets-Sheet 1
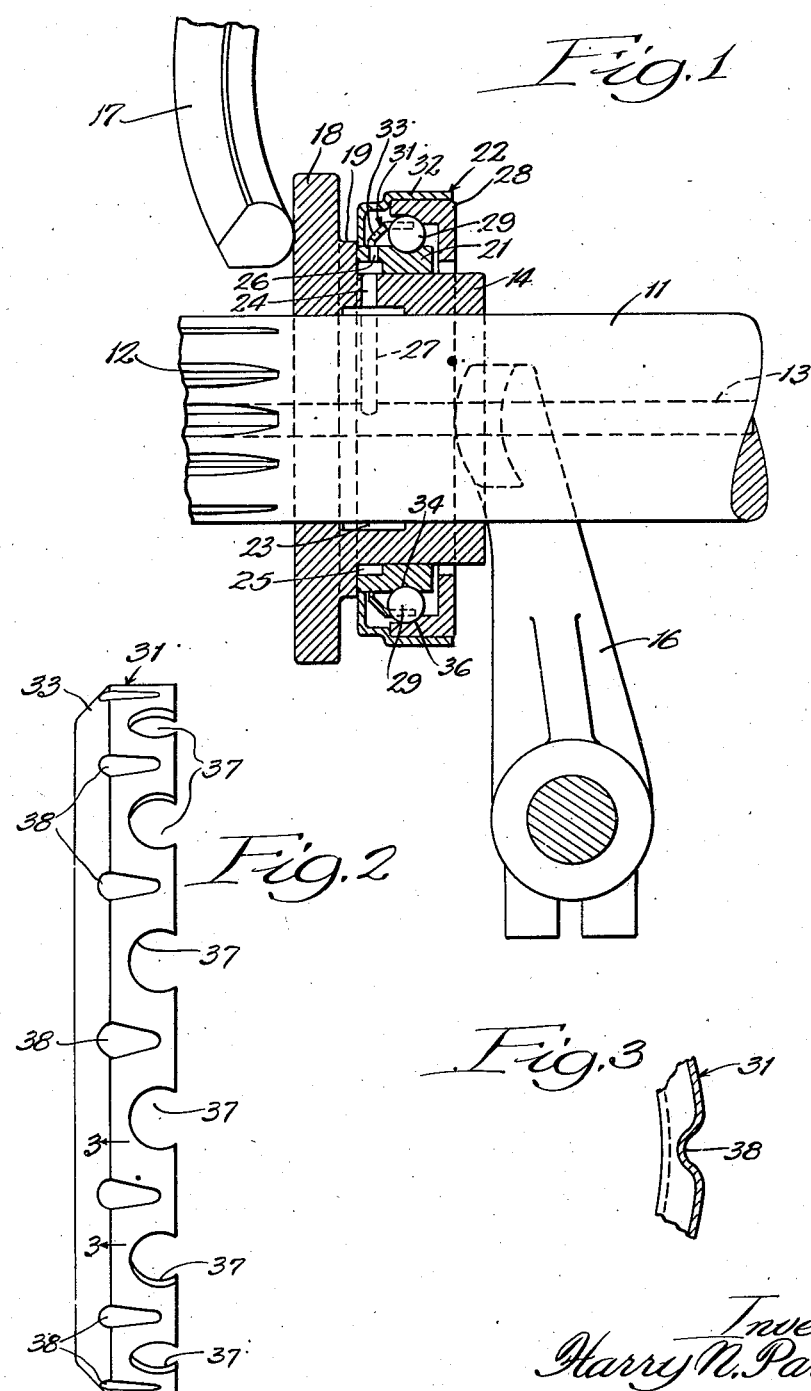

July 10, 1945.  H. N. PARSONS  2,380,327
BEARING
Filed April 3, 1943   2 Sheets-Sheet 2
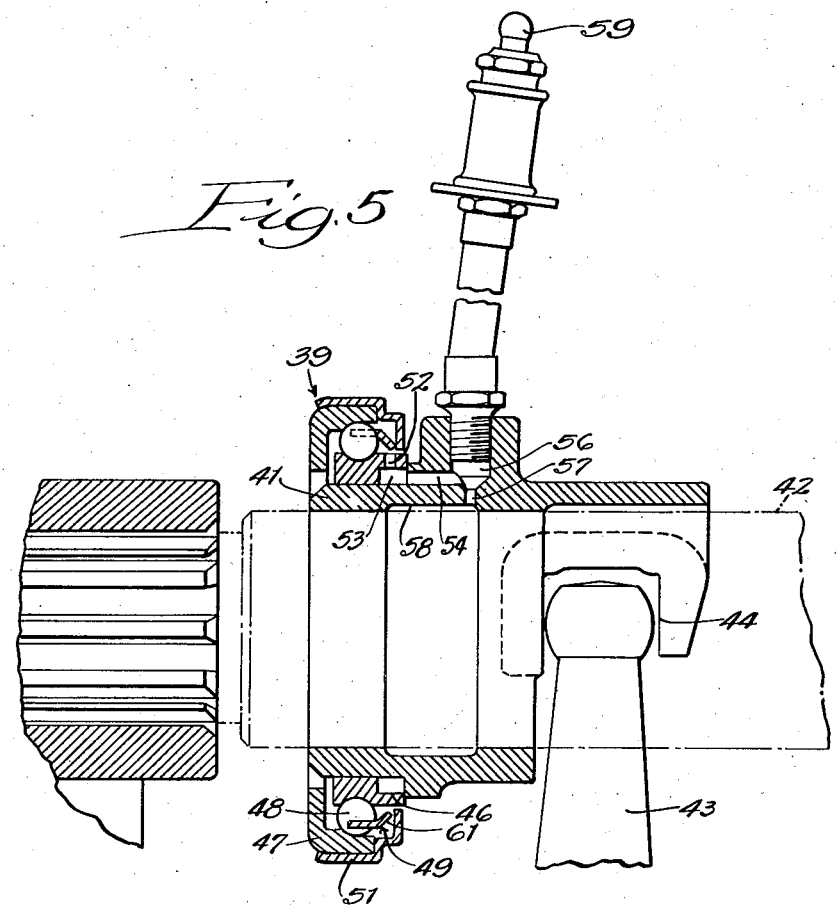
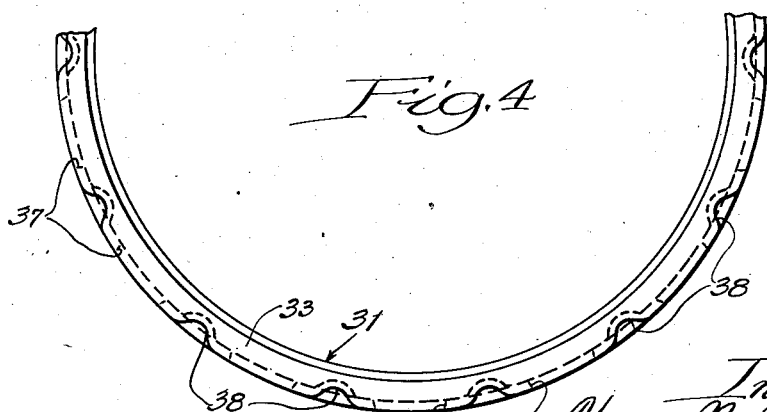
Inventor:
Harry N. Parsons,
By Paul O. Pippel
Attorney.

Patented July 10, 1945

2,380,327

UNITED STATES PATENT OFFICE 2,380,327

BEARING

Harry N. Parsons, Chicago, Ill., assignor to International Harvester Company, a corporation of New Jersey Application April 3, 1943, Serial No. 481,713

3 Claims. (Cl. 308—187)

This invention relates to a new and improved bearing which has for one of its principal objects the provision of means for directing a lubricant to the bearing members.

Heretofore, ball or roller bearings, particularly those used in conjunction with actuating clutches, have required special lubricating means which have taken many forms. However, no satisfactory method has been discovered to adequately maintain a continuous supply of lubricant to the bearing members without intermittent stopping and refilling. Some methods of lubricating bearings have been capable of supplying lubricant to the interior of the bearing races, but, in spite of this fact, the lubricant would tend to aggregate in corners and not properly lubricate the bearing members.

It is an important object of this invention, therefore, to provide lubrication for a bearing and to additionally direct the lubricant to the bearing members proper.

Another and further important object of this invention is to provide a lubricated bearing having a bearing member retainer capable of causing lubricant circulation.

A still further important object of this invention is the provision of means for directing a lubricant to a bearing interior regardless of whether or not the lubricant is fed centrifugally or caused to enter by external pressure.

Other and further important objects will become apparent from the disclosures in the following specification and accompanying drawings, in which:

Figure 1 shows a ball bearing incorporating the lubricant deflector of this invention;

Figure 2 is a detailed end elevational view of the retainer employed in the bearing as shown in Figure 1;

Figure 3 is a sectional view taken on the line 3—3 of Figure 2;

Figure 4 is a front view of the retainer shown in Figure 2; and

Figure 5 shows a bearing similar to that of Figure 1 in a modified installation.

As shown in the drawings, the reference numeral 11 indicates generally a shaft or the like having a splined end, as shown at 12, and a centrally located passage 13 running longitudinally thereof. A sleeve 14 is slidably mounted on the shaft 11. A bifurcated lever, one arm 16 of which is shown, is capable of shifting the sleeve 14 leftwardly to cause engagement of the clutch. A second bifurcated lever, one arm 17 of which is shown, is capable of causing a rightward shifting of the sleeve 14 to thereupon disengage the clutch members. The sleeve 14 has an integral end flange 18 and an intermediate shoulder 19 against which an inner race member 21 of a ball bearing 22 abuts. An annular internal groove 23 is positioned substantially centrally of the sleeve 14, and the sleeve is equipped with one or more radial passages 24 which extend from the groove 23 to an annular groove 25 in the inner race-ring member 21. It will be understood that the annular groove 25 may take the form of a counterbore or notch as desired. A passage, or passages, 26 leads from this groove 25 through the inner race-ring member 21, whereupon lubricant having the desired viscosity may be fed through the central channel 13 in the shaft 11, and because of centrifugal force the lubricant is thrown radially outwardly through a radial passage 27 to the relatively wide groove 23 and thus outwardly and upwardly through the passages 24 and 26 to the interior of the bearing 22.

The inner race member 21 is mounted unitarily with the sleeve member 14 and is opposed by a rotating outer race member 28. Rolling elements 29 are positioned between the inner and outer race members 21 and 28, respectively, and are maintained in predetermined spaced apart relative positions by a retainer or cage 31, shown in greater detail in Figures 2, 3, and 4. Superposing the outer race member 28 is an outer housing 32 which is press-fitted onto the outer race member.

The retainer member 31 has a conical flange 33 depending downwardly so as to aline itself with the passage 26. Lubricant being thrown outwardly from the lubricant source in the shaft through the passage 26 will be directed to the rolling members 29 by the angularly depending flange 3. The end of the flange member 33 is so positioned over the passage 26 that the lubricant stream is divided, a portion of it being directed by the underside to the ball 29, and the remaining portion of the lubricant adhering to the outer surface of the flange 33 and also flowing to the ball members 29. The purpose of dividing the lubricant stream is to produce better circulation and to lubricate the rolling members 29 at their required points of lubrication. The inner race-ring 21 is equipped with an annular race groove 34 within which the rolling members seat. The outer race member 28 is equipped with a curved race portion 36, against which the outer portions of the rolling members 29 seat. It is essential, therefore, that the lubricant in a ball or other bearing of this type be directed to the inner and outer races 34 and 36, respectively, and such lubrication is supplied by the split lubricant stream of this device.

As shown in Figure 2, the retainer member 31 is supplied with ball sockets 37 at regular intervals around the circumference thereof, and, intermediate the sockets, depressions 38 are made in the retainer surface, as shown in all of Figures 2, 3, and 4. These depressions 38 increase the strength and rigidity of the retainer member 31 and further cause added circulation and agitation of the lubricant within the interior of the bearing as defined by the inner race member and the outer race member and housing combined.

As shown in Figure 5, a bearing 39 similar to the bearing 22 superposes a sleeve 41 slidably mounted on a shaft 42. The sleeve 41 obtains its movement from the lever arm 43 of a bifurcation acting within the socket member 44 on the sleeve 41. This bearing 39 has inner and outer race members 46 and 47, respectively, ball members 48, a ball retainer 49, and an outer housing 51 corresponding in every respect to the bearing 22. A passage, or passages, 52 in the inner race member 46 corresponds to the passage, or passages, 26 in the bearing 22 and extends from the interior of the bearing to an annular groove 53 in the outer portion of the inner race member. The groove 53 proceeds to the end of the inner race member 46, and, rather than superposing a radial passage in the sleeve member 41, is positioned adjacent the channel 54, which proceeds from a grease passage 56 within the sleeve member 41. The grease passage 56, in addition to joining with the channel 54, extends downwardly through the extension 57 to an annular internal groove 58 within the bore of the sleeve member 41 corresponding to the groove 23 of the sleeve 14 shown in Figure 1. The grease passage 56 is fed with a lubricant by some external pressure means through the grease fitting and tube 59.

In operation, lubricant is introduced by pressure through the fitting and tube 59 to the grease passage 56 and there is diverted through the channel 54 to the annular groove 53 in the inner race member 46 of the bearing 39, whereupon it is extruded or expelled by reason of the continued lubricant pressure and enters the interior of the bearing 39 through the radial passages 52, whereupon it strikes the angularly depending flange 61 of the retainer member 49 similar to that described in Figure 1. The lubricant clings by adhesion to the inner and outer surfaces of the retainer flange 61 and adequately lubricates the rolling element contact surfaces. The retainer member 49 is similar to that shown in Figures 2, 3, and 4, and indentations 38 therein cause continued positive agitation of the lubricant within the interior of the bearing by reason of rotation of the outer race member and its accompanying appurtenances. At such times as the bearing is inoperative the lubricant will collect in the lower portion of the annular channel formed by the outer race member and its jacket or housing. Upon rotation of either race-ring member, the rotation of the retainer will recirculate the lubricant and initially lubricate the rolling elements and surfaces.

I have thus provided a well-lubricated bearing adapted for use in many installations, and, regardless of whether the bearing members used are of the ball or roller type, means is provided for positively directing lubricant to the bearing members, and continued agitation and circulation of the lubricant is assured by my novel retainer.

The intention is to limit the invention only within the scope of the appended claims.

What is claimed is:

1. A bearing comprising inner and outer race members, balls therebetween, a housing substantially enclosing said bearing, an annular retainer for said balls having ball sockets therein at intervals therearound, depressions in said retainer between said sockets, one of said race members having a passage therethrough, and means on said retainer for directing a lubricant from said passage to said balls.

2. A bearing comprising inner and outer races, balls therebetween, a housing substantially enclosing said bearing, an annular retainer for said balls having ball sockets therein at intervals therearound, depressions in said retainer between said sockets, one of said races having a passage therethrough, and means on said retainer for directing a lubricant from said passage to said balls, said means comprising an angularly depending flange terminating directly above said passage.

3. A bearing comprising inner and outer concentric race members, balls therebetween, a cover for said outer race member substantially enclosing said bearing, an annular retainer for said balls having ball sockets therearound, and indentations in said retainer between said sockets, said inner race member having a passage therethrough, said retainer having an angularly depending flange terminating directly over said passage whereby lubricant fed through said passage will form an adhesion to said flange and be carried to said balls whereupon it will continue to be circulated and agitated because of said indentations.

HARRY N. PARSONS.